(12) United States Patent
Strong

(10) Patent No.: US 7,047,613 B2
(45) Date of Patent: May 23, 2006

(54) BLADE ASSEMBLY FOR DOUBLE END NIBBLER TOOL

(76) Inventor: Joseph M. Strong, 55 Teed Ave., Barrington, RI (US) 02806

( * ) Notice: Subject to any disclaimer, the term of this patent is extended or adjusted under 35 U.S.C. 154(b) by 205 days.

(21) Appl. No.: 10/757,943

(22) Filed: Jan. 15, 2004

(65) Prior Publication Data

US 2004/0143972 A1    Jul. 29, 2004

Related U.S. Application Data

(60) Provisional application No. 60/440,931, filed on Jan. 17, 2003.

(51) Int. Cl.
   *B23P 6/00*    (2006.01)

(52) U.S. Cl. .......................... 29/402.08; 30/241; 83/13; 83/916; 29/402.15

(58) Field of Classification Search ................... 83/697, 83/698.91, 916; 30/241; 29/402.08, 404.15
   See application file for complete search history.

(56) References Cited

U.S. PATENT DOCUMENTS 3,341,930 A * 9/1967 Belanger ............... 29/890.031

* cited by examiner

*Primary Examiner*—Allan N Shoap
*Assistant Examiner*—Carolyn Blake
(74) *Attorney, Agent, or Firm*—Robert J Doherty

(57) ABSTRACT

A blade or punch assembly for double-ended nibbler tools which affords easier removal by in part providing a blade having central portions of a single diameter equal to or slightly less than the composite bore through which it is adapted to extend.

1 Claim, 6 Drawing Sheets

BLADE ASSEMBLY FOR DOUBLE END NIBBLER TOOL

Applicant claims the benefit of U.S. Provisional Patent Application No. 60/440,931 filed Jan. 17, 2003.

BACKGROUND OF THE INVENTION

This invention relates to nibbling tools and more specifically to nibbling tools that incorporate a double-headed structure such that opposed die cutting ends can be alternatively utilized by the operator so that when the blade of one end becomes dull the other cutting end can be utilized simply by removing a handle covering or grip provided over one end to expose the alternate die cutting end and then utilizing the handle to cover the other cutting die end. Such double-ended tools can utilize either separate blades or punches or a single blade or punch. The present invention is directed to those tools utilizing a single punch. The handle is provided to enable the operator to grasp and manipulate the tool.

Nibbling tools have been available in various forms for many years and include those set forth in UK Patent No. 1,485,795 published Sep. 14, 1977; U.S. Pat. No. 4,489,492 issued Dec. 25, 1984; U.S. Pat. No. 4,748,744 issued Jun. 7, 1988 and U.S. Pat. No. 4,158,913 issued Jun. 26, 1979.

All of the above-noted patents disclose a nibbler tool that includes a single die cutting head and a punch or blade that reciprocates with respect to the die. The die has an entry area or slot for receipt of a sheet of material such as thin sheet metal and is provided with a cutting surface that cooperates with the punch or blade. During operation, the punch or blade reciprocates in a linear motion and cooperates with the die to bite or nibble a small crescent-shaped piece of material from the sheet with each punch stroke. As the operator's hands guide the tool, the nibbler tool cuts a slot in the desired direction.

More recently, nibbler tools incorporating a double-headed die structure have been introduced as above indicated. FIGS. 1 and 2 of the present drawings show the essential construction of one of such devices and in particular shows the construction of the reciprocating biter blade or punch housed within the structure itself. Although a decided improvement over single head nibbler tools, these double-headed nibble tools required considerable disassembly to install a new operating cutting punch or blade.

Accordingly, it is the object of the present invention to provide such double-headed nibbling tool structures with an improved blade assembly such that the blade can be easily removed with minimal disassembly and without requiring removal of either of the die heads or causing misalignment of the blade location block during such procedure. These and other objects of the present invention are accomplished by providing an elongated punch or blade having an extensive central portion of a uniform diameter that is equal to or slightly less than the diameter of the longitudinally oriented shaft or bore in which the blade is adapted to be received in the composite structure of the device. In this way, the replacement blade can be utilized to force the old and presumably dull blade out of the longitudinal bore while still maintaining contact with the blade location and drive block at all times such that misalignment thereof cannot occur and additionally afford a simple removal/installation procedure in the intended manner.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
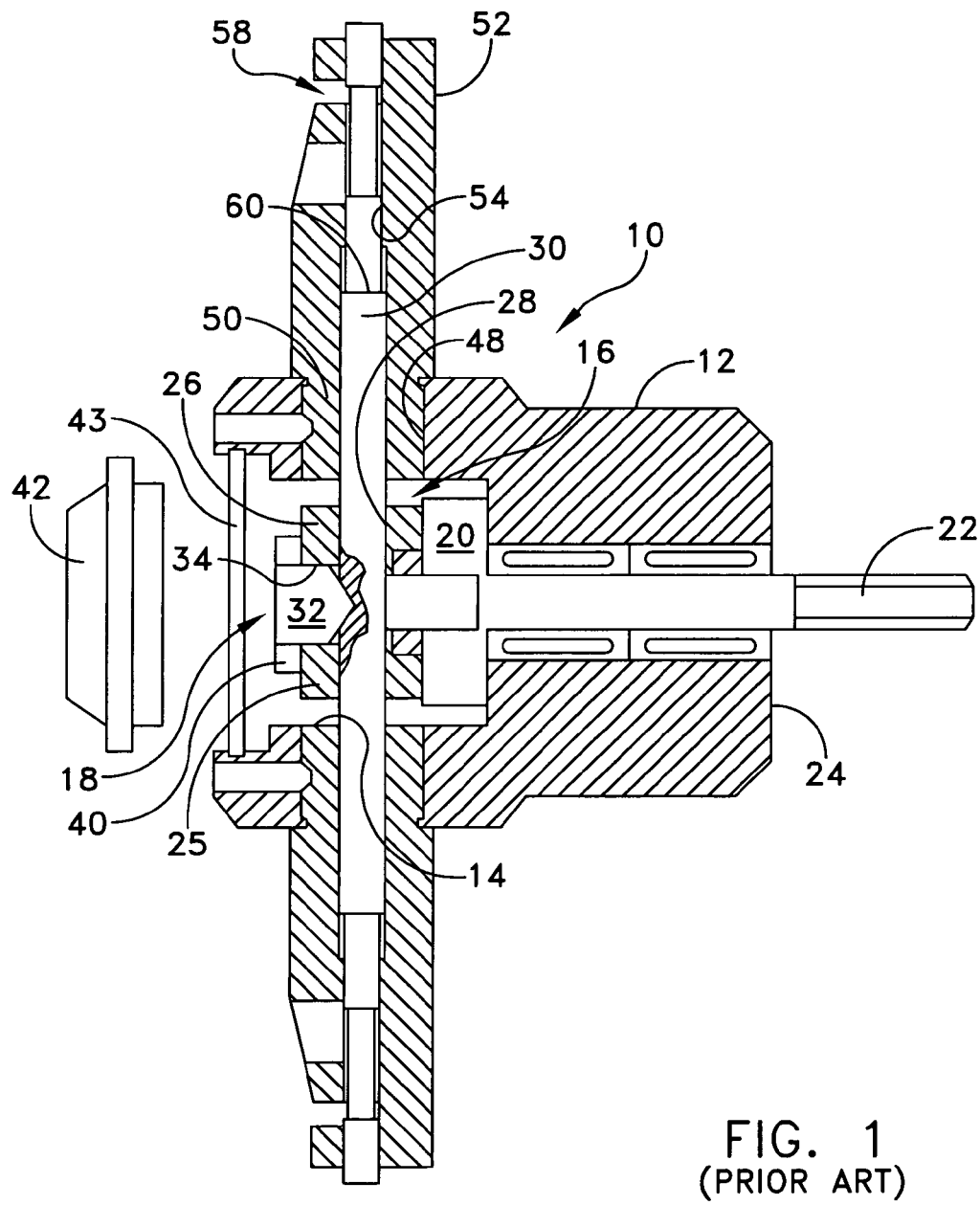
FIG. 1 shows a cross-sectional view of a prior art double-ended nibbler tool.
Figure 2:
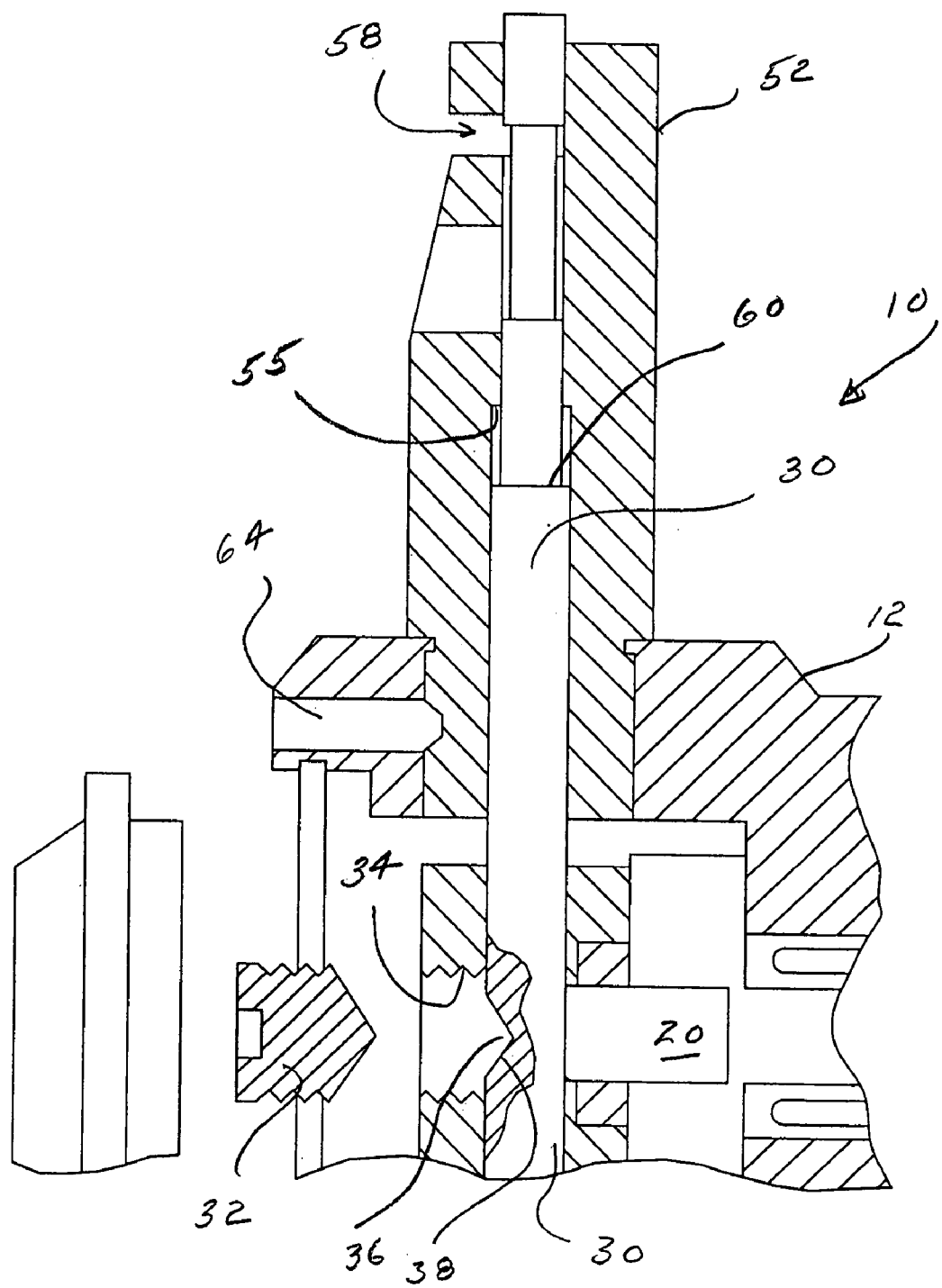
FIG. 2 shows an enlarged section of the tool of FIG. 1 and in particular shows the shape of the removable blade and the manner in which its central portion is enlarged.
Figure 3:
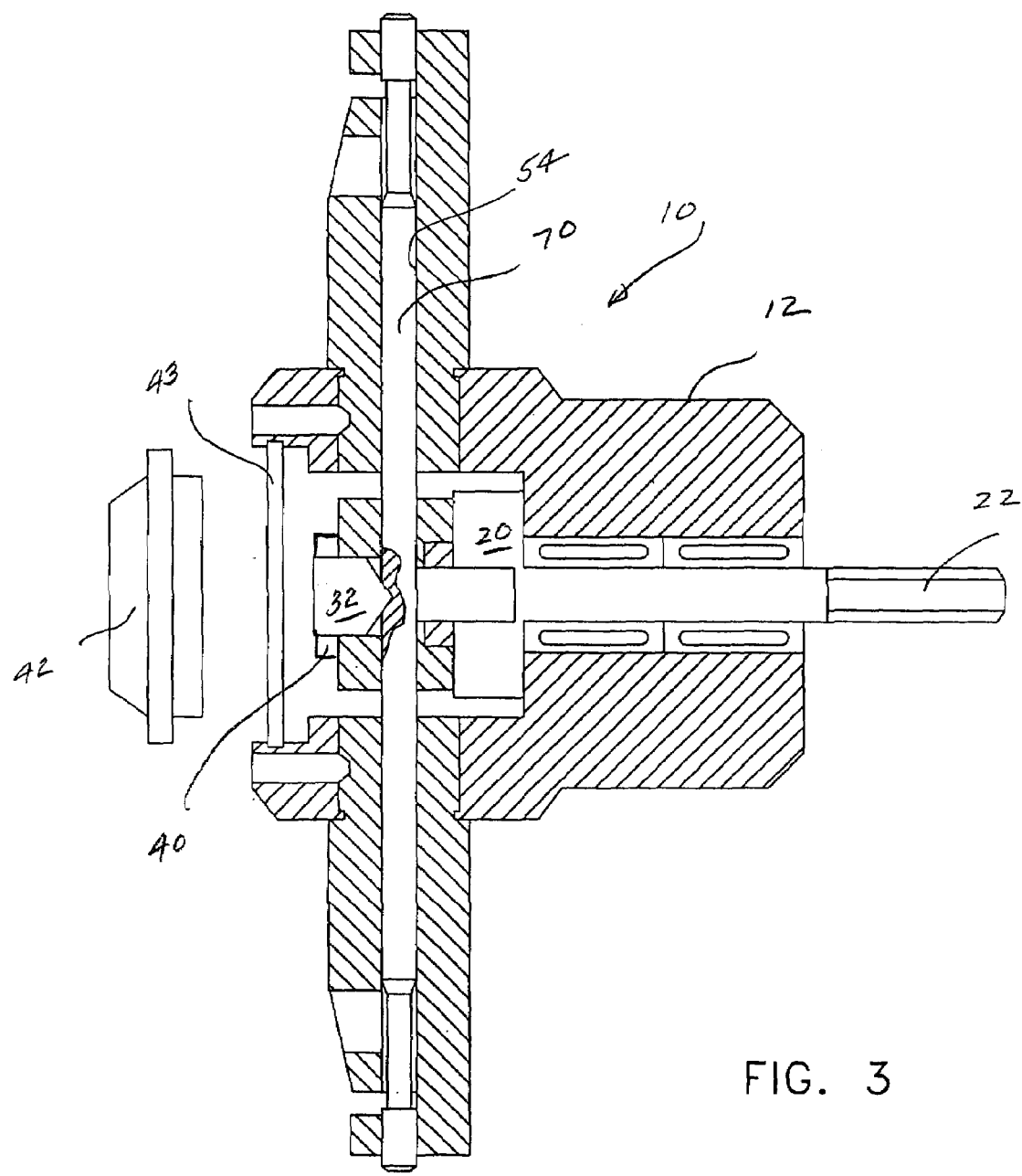
FIG. 3 is cross-sectional view of the improved nibbler tool blade assembly of the present invention.
Figure 4:
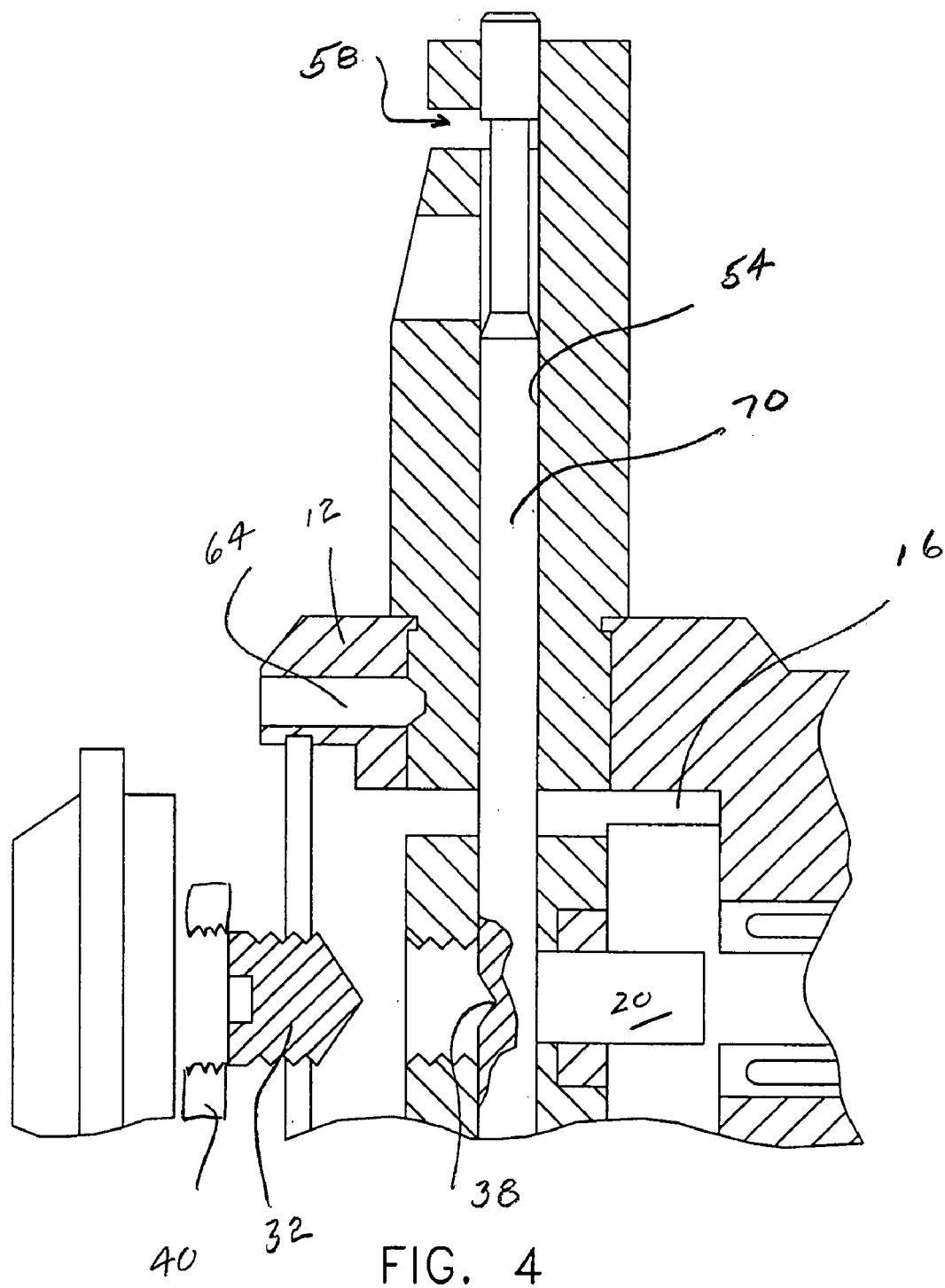
FIG. 4 is an enlarged cross-sectional view of FIG. 3.
Figure 5:
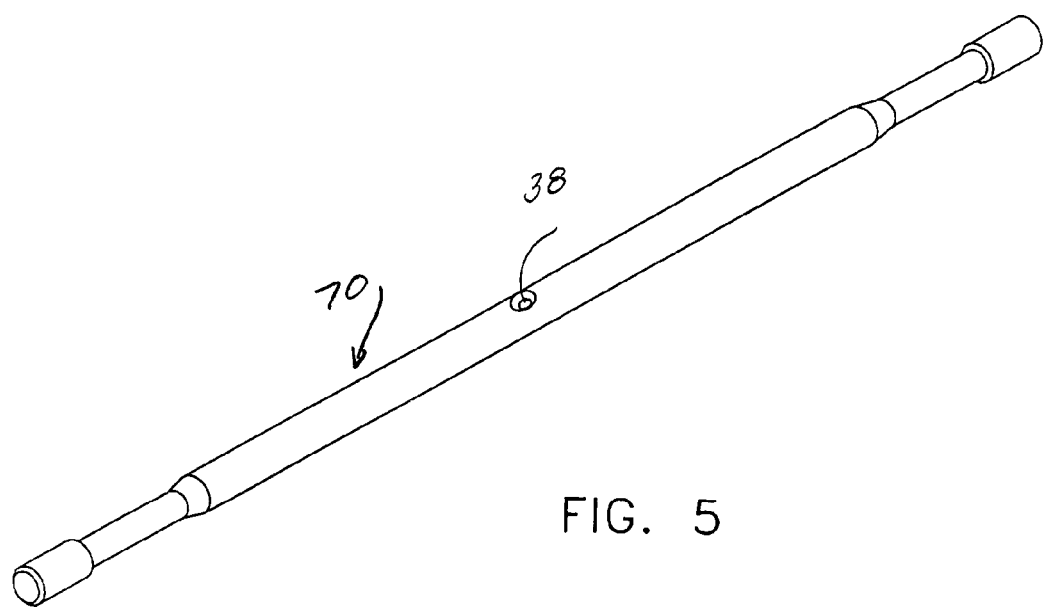
FIG. 5 is an elevational view of the new blade structure itself.

Turning now to the drawings and particularly to FIGS. 1 and 2, the nibbler 10 shown therein includes a body 12 of generally cylindrical shape and including an open bore 14 at the top 16 thereof which part forms an internal cavity 18. A drive mechanism 20 is located in the cavity and is utilized to transfer rotary movement from a drive shaft 22 to reciprocating longitudinal movement of a blade connector. The shaft extends through the base 24 of the body 12 and connected to the drive mechanism at one end thereof and a source of rotary motion such as a rotary drill (not shown) at the other end thereof. The drive mechanism is, in turn, connected to a blade location block 25 which includes a longitudinally extending body 26 having a longitudinal bore 28 therethrough adapted to receive and removably connect the nibbler blade 30 thereto. The drive mechanism may be of any known appropriate structure and of itself forms no part of the present invention; however, appropriate structures are shown in the prior art patents set forth above, e.g., U.S. Pat. No. 4,489,492 to Diggins which is herewith incorporated into the present specification.

A setscrew 32 is adapted to be threaded into an upper bore 34 in the blade location block and is provided with a conically-shaped forward end 36 that extends into a depression 38 centrally formed in the blade 30. A lock 40 in the form of a nut having an internal threaded bore that engages both the setscrew and the top surface of the blade block is provided to assure continual fixed engagement of the blade location block to the blade. End cap 42 is provided to close the opening of the body 12. Normally, a spring clip 43 is utilized to hold the end cap in position, but other means can be utilized.

A pair of aligned bores 48 extend through opposed sides of the body 12 in alignment with the blade location block bore but each of far greater diameter to respectively receive an inner forward cylindrically-shaped end 50 of each of the dies 52. The dies include a central bore 54 to receive the blade—each bore being aligned with each other such that the blade may reciprocate upon drive shaft movement longitudinally within the compositely formed structure and operate to cut sheet material as it is fed into the receiving slot 58 of each die by the forward movement of the device vis-à-vis the sheet as is known in the art.

The central portion of such blade is of an enlarged diameter and, in effect, forms a shoulder portion 60 at each end thereof which is adapted to abut against an inwardly extending shelf provided in each die. In order for the blade to be removed in such prior art structures each die head has to be removed from the body by removing each respective setscrew 64 which retains such dies within the body and then the end cap locking bolt and setscrew removed or, at least, loosened such that the setscrew no longer engages the blade detent. Thereafter, the old blade may then be removed. Thereafter, a replacement blade may be installed by inserting one end thereof into one of the opposed bores 48 of the body and attempting to thread such through the bore 28 of the blade location block 25. Sometimes this threading action requires extensive manipulation since the position of the blade block. 25 and thus the orientation of the bore 26 thereof can be shifted upon movement of the blade block once the old punch is removed. Once the threading of the punch into the block 25 has been achieved, the opposite die ends are mounted over the opposite ends of the punch and then placed into their receiving bores and clamped into place by setscrews.

Figure 6A:
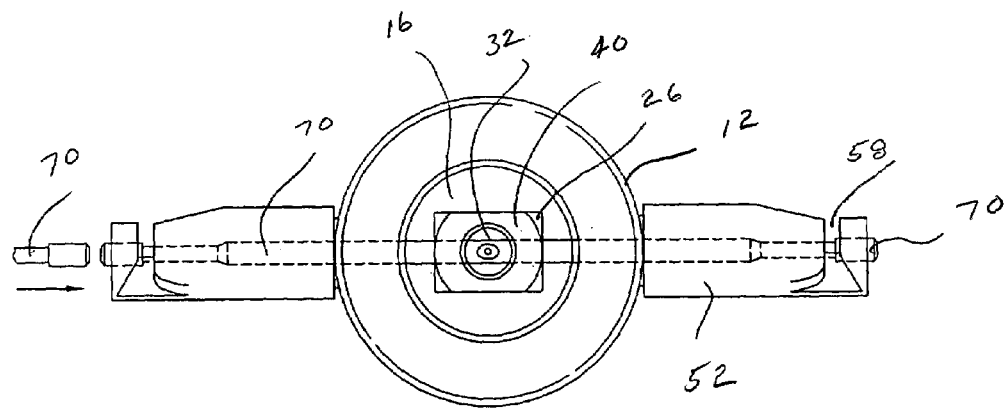
FIG. 6 is a series of three progressive views showing the manner in which the old used blade in the present invention is removed by being pushed outwardly of its operational bore by the new blade without interfering with the blade location block.
Figure 6B:
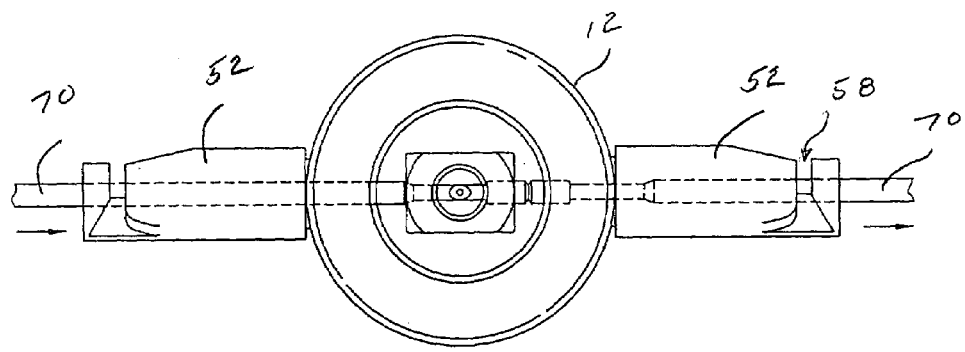
Figure 6C:
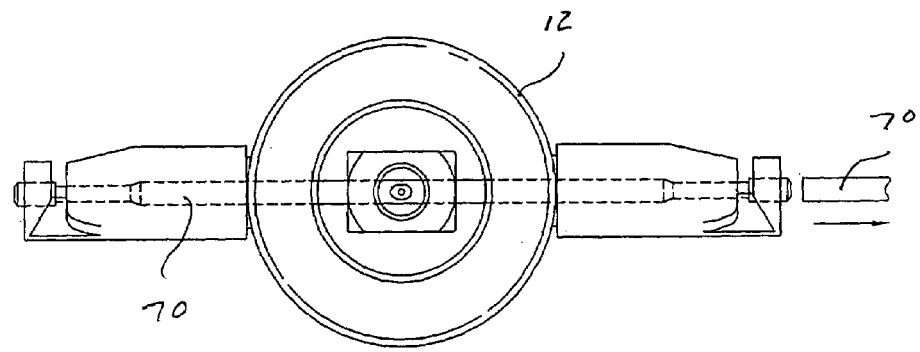

The structure of the present invention eliminates such complex and sometimes frustrating blade or punch removal described in the preceding paragraphs above by providing a blade structure 70 which is of a single continual central diameter and fits within a composite receiving bore within the overall body structure that is equal to or slightly greater than the blade diameter. Thus, the thicker central diameter of prior art punches is eliminated as is the shoulder or stop present in the die head central bore 54. These changes enable the replacement blade to pass through the composite bore from one end to the other without obstruction, e.g., at shoulders or stops 55. In this way only the end cap need be removed from the body, the locking bolt either removed or loosened to the extent that the setscrew is no longer engaged with the blade detent and then the new blade positioned at either end to engage the old blade and then pushed longitudinally to force the old blade progressively through the composite bore out the other end thereof until the new blade takes its correct position with its detent engaged centrally of the blade location block. Such action, especially brought out in FIG. 6, enables the new blade and old blade to compositely maintain the desired blade location block orientation since at all times either the old blade or the new blade is positioned in the bore 26 of such block 25 so that misalignment cannot occur. When the old blade has been completely removed from the opposite die end, the setscrew is simply screwed into engagement with the blade detent, the lock bolt tightened thereon and the end cap reinstalled—a relatively simple procedure which not only ensures the maintenance of the blade locator block but also eliminates the necessity of removing both of the die ends as in the prior art devices.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described.

I claim:

1. The method of changing an old punch blade with a new replacement blade in a double ended nibbler tool having a housing supporting a pair of opposed die cutting heads in turn having a single punch double ended blade adapted for linear reciprocal motion with respect to the housing and to the die cutting heads and wherein the housing includes a centrally disposed reciprocating motion transmitting means in turn incorporating a blade location and holding block with fastening means for fixing the position of the blade to the block, and a blade assembly including a bore extending longitudinally through each of the die heads and wherein such die head bores are spaced from but longitudinally aligned with a bore longitudinally extending through the holding block so as to form a composite bore adapted to receive the blade and wherein the composite bore is of an equal operational diameter throughout the longitudinal extent thereof and the blade of a diameter not exceeding that of said composite bore comprising, releasing the fastening means such that the old blade to be replaced is free to slide with respect to the composite bore, introducing the replacement blade into the opening end of one of the die head bores and into contact with the old blade, progressively moving the replacement blade into said one die head bore and through said holding block bore while simultaneously utilizing said old blade to maintain the alignment between said holding block bore and said die head bores and thereafter into the opposite die head bore while thereby pushing the old blade completely out of said composite bore and thereafter fixing said replacement blade to said holding block with said fastening means.

* * * * *